April 22, 1952 M. LICHAW 2,593,579

PORTABLE RADIO RECEIVING SET

Filed Oct. 19, 1948 2 SHEETS—SHEET 1

INVENTOR.
MILTON LICHAW

BY Joltan Polachek

ATTORNEY

April 22, 1952 M. LICHAW 2,593,579

PORTABLE RADIO RECEIVING SET

Filed Oct. 19, 1948 2 SHEETS—SHEET 2

INVENTOR.
MILTON LICHAW

BY Zoltan P. Polachek

ATTORNEY

Patented Apr. 22, 1952

2,593,579

UNITED STATES PATENT OFFICE 2,593,579

PORTABLE RADIO RECEIVING SET

Milton Lichaw, Brooklyn, N. Y.

Application October 19, 1948, Serial No. 55,260

2 Claims. (Cl. 312—7)

This invention relates to new and useful improvements in portable radio receiving sets, and, more particularly, the aim is to provide a novel and valuable radio receiver in that it may readily be arranged for curvilinear longitudinal extension for hugging a part of the body of the user, as by partially embracing a person's waist and then for suspension from a belt or the like also serving as an element of such person's apparel.

A feature of the invention, further, is that the radio receiving set is housed in a plurality of cabinet units, with these units mechanically connected in such manner that, while they always are maintained in coupled relation, one of such units may be bodily swung relative to another, either to provide a plural-unit cabinet having the curvilinear extension above mentioned, or to provide a plural-unit cabinet wherein said units are arranged one in front of another thereby to establish a less lengthy plural-unit cabinet and one which although increased in over-all width is of small bulk and of a total basal area to be rested dependably on a suitable support when the radio receiver is removed from the body of the user.

The operative components of the receiving set may be variously distributed in the different cabinet units as decided on by the designer. For example, in one selected cabinet unit there may be placed one or more tubes and/or a battery equipment and/or a variable condenser and/or one or more fixed condensers and/or one or more resistance and inductance instrumentalities and/or the loud speaker, and, in another or the other cabinet units present, there may be housed those of said components other than the one or more housed in the said selected unit.

A further feature of the invention is that the aforesaid mechanical connection, between each two cabinet units present, is hollow or rather tubular in nature, and the necessary electrical connections are extended by way of and through such mechanical connection from the interior of one cabinet unit to the interior of another. An antenna of course will be present, and while this may be wholly in one cabinet unit, or partially in different cabinet units, a good length for such antenna can be obtained by extending it through all the cabinet units present and also through the mechanical connection between each two adjoining cabinet units.

The number of units in the plural-cabinet radio receiver of the invention may be any desired; but, by way of example, two forms of the invention are illustrated, in one of which there are two cabinet units, and in the other of which there are three such units.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2, 3, 4, 5, 5A:
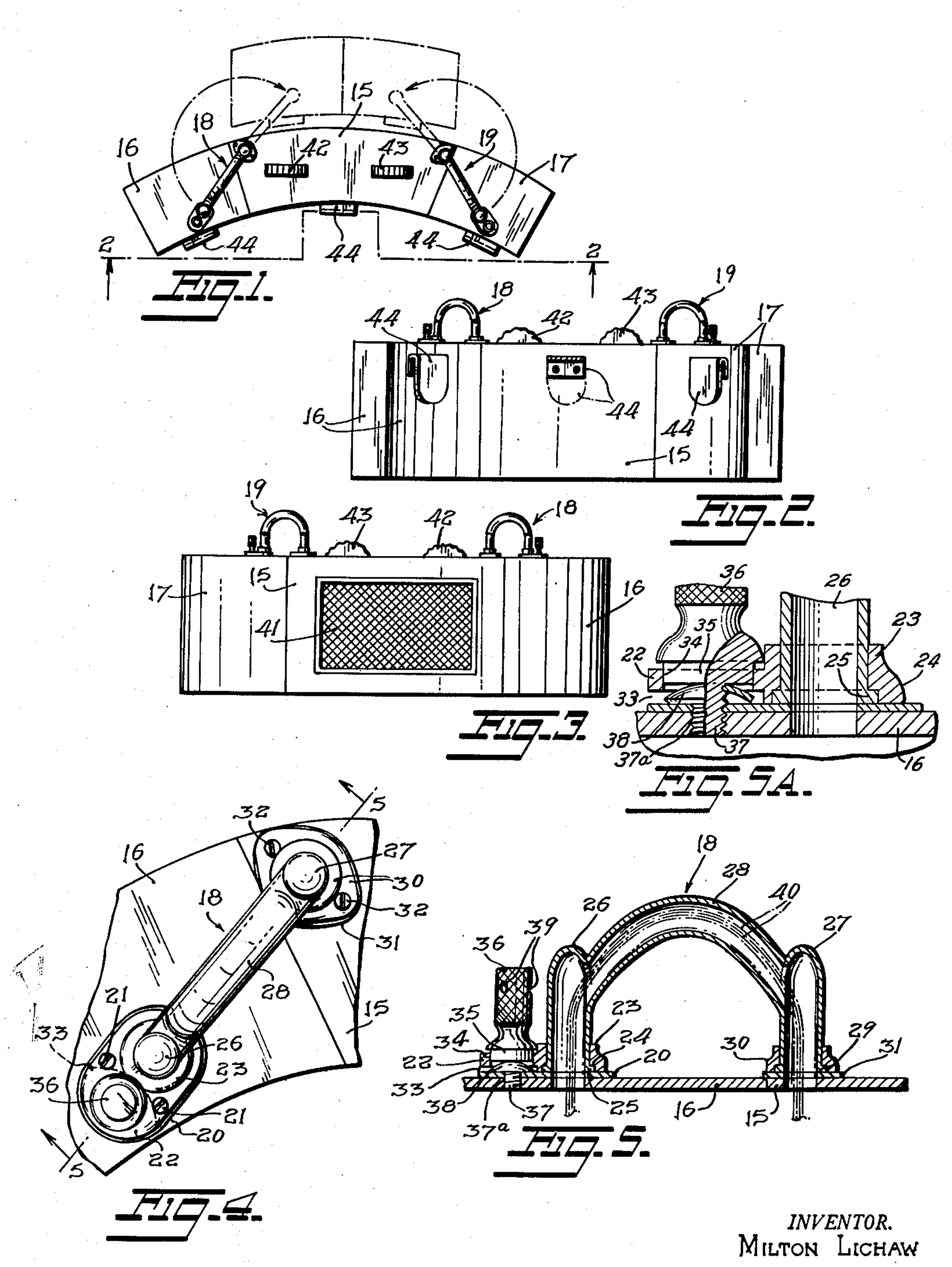
Fig. 1 is a top plan view of a now favored three-unit-cabinet embodiment of the invention; the same being shown in full lines as curvilinearly extended for being personally carried as already explained, and in dot and dash lines as rearranged to provide a cabinet assembly substantially as wide as it is long.
Fig. 2 is partly a vertical section taken on the line 2—2 of Fig. 1 but mainly a side elevation looking toward the concavely curved face of the cabinet assembly.
Fig. 3 is a side elevation looking toward the convexly curved face of said assembly.
Fig. 4 is an enlarged fragmentary top plan view.
Fig. 5 is a vertical section, taken on the line 5—5 of Fig. 4.
Fig. 5A is an enlarged detailed view of a portion of Fig. 5.

Referring to the drawings in detail, and first to Figs. 1–7, the three cabinet units here shown comprise a central longer unit 15 and two shorter end units 16 and 17. The units 15 and 16 are swingably mechanically connected by a link-type coupling generally designated 18, and the units 15 and 17 are similarly connected by a link-type coupling generally designated 19. These couplings, together with their adjuncts, are alike;

and a description of one will suffice as a description of the other.

Referring in this regard especially to Figs. 4 and 5, the upper side of the top of the cabinet unit 16 carries a plate 20, secured thereto by two screws 21. On the top of said plate, and secured thereto by the screws 21, is a fitment 22 having an upstanding collar 23. Said collar is undercut to provide a downwardly facing inner annular shoulder 24. Rotatively mounted in the recess below said shoulder is an external annular flange 25 at the bottom of a hollow standard 26 open at its bottom and closed at its top. This standard, together with a like standard 27, and a tubular connecting bridge-piece 28, constitutes the link-type coupling 18; it being noted that the interior of said bridge-piece opens into the interiors of the two standards.

The screws 21 have no threaded connection with the fitment 22 and those screws are loosely threaded into position so that the fitment may move slightly vertically on those screws.

The flange 29 on the bottom of the standard 27 is rotatively mounted in a fitment 30 as is the flange 25 of the standard 26 in the fitment 22; there being interposed between the fitment 30 and the upper side of the top of the cabinet unit 15 a plate 31 corresponding in function to the plate 20. The plate 31 is held in place by the same two screws 32 which attach the fitment 30 to the unit 15.

The fitment 22 has an undercut cavitation 33 at its bottom and at one end of an elongate basal flange included in said fitment. Above said cavitation the fitment has a cylindrical aperture 34, within which is located an intermediate cylindrical portion 35 of a thumb-screw 36; said portion 35 being of larger diameter than the threaded shank 37 of said screw. Sleeving the shank 37 of the screw, between the bottom of the portion 35 of the screw and the top of the plate 20, is a dished spring washer 38. The thread of the shank 37 spirally engages a matching thread tapped into a hole 37ª drilled through the plate 20 and the top wall of the unit 16. Such top wall may be of some light weight metal or plastic material adapted to retain a thread, or a small metal plate may be suitably secured at the underside of said top wall for being drilled and threaded, or the plate 20 may be made of such thickness as practically to carry the entirety of the thread to match the thread of the screw.

The screw 36, shown as having a vertically elongated knurled head, may also be provided with a plurality of radially extending well-like recesses 39. The purpose of the screw 36 is to effect a frictional yet secure locking, if desired, of the link-type coupling 18 relative to the cabinet unit 16, in any disposition of such unit relative to the unit 15. The recesses 39 in the screw permit a nail or the like to be used to tighten the screw 36 in position.

The screws 21 serve to retain the plate 20 and the fitment 22 from rotating about the thumb-screw 36 as a fulcrum retaining the hollow standard 26 in vertical alignment with its respective opening in the cabinet unit 16. When the thumb screw 36 is loosened, the dished spring washer 38 will raise the fitment 22 against the heads of the screws 21 releasing the standard 26 for rotation of the cabinet unit 16.

The hollow bottom of the standard 26 opens into the interior of the cabinet unit 16, as by way of the openings shown in Fig. 5 through the plate 20 and the top of said cabinet unit; and the hollow bottom of the standard 27 similarly opens into the interior of the cabinet unit 15. Schematically indicated in dot and dash lines at 40 are the wire or wires, of course suitably insulated, extended through the link-type coupling 18.

The cabinet unit 15 is shown as having at its convex face a grille 41, in front of a loud speaker contained in such unit. Said unit 15 is shown as also having two suitably rotatively mounted knobs 42 and 43 partially projecting above the top of the unit; one of such knobs, for instance, for tuning, and the other, for instance, for volume control.

Figure 7:
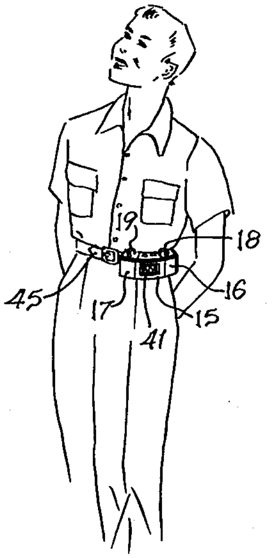
Fig. 7 illustrates the manner in which the radio receiver of Figs. 1–6 may be carried at a person's waist.

One or more of the units may be provided with suitable means for detachably hanging the plural-unit cabinet on a person's belt or the like when the plural-unit cabinet is arranged as in Figs. 2 and 3 and as shown in full lines in Fig. 1. In the present case, each cabinet unit is illustrated as having fixed thereon and at its concave face a hook-clip 44. In Fig. 7, the receiver is shown thus worn, hanging by the clips 44 on a man's belt 45.

Figure 6:
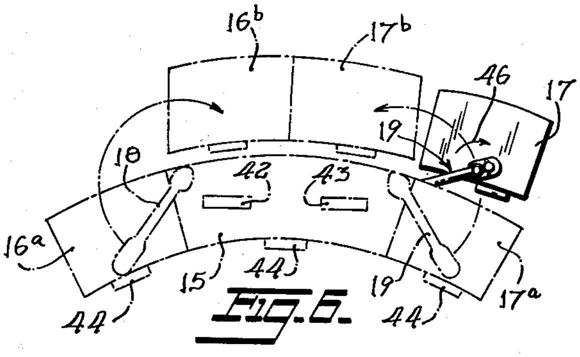
Fig. 6 is a view similar to Fig. 1, but showing in full lines one of the cabinet units in course of being redisposed from its full line position in Fig. 1 to its position indicated in dot and dash lines in Fig. 1.

For redisposing the receiver as shown in dot and dash lines in Fig. 1, and assuming the thumb-screw 36 and the corresponding thumb-screw of the link-coupling 19 are not tightened to prevent swing of the couplings 18 and 19 relative to the cabinet units 16 and 17, it is merely necessary to swing both said units in the directions indicated by the dot and dash line arrows in Fig. 1, until said units 16 and 17 mutually endwisely abut as illustrated. Referring in this connection to Fig. 6, in thus swinging the unit 17 from its position here indicated at 17ª to its 17ᵇ position, said unit, when it has about reached the position thereof shown in full lines in this view, is also given sufficient slight rotation in the direction of the arrow 46 to allow advance of the unit endwisely thereof to be effected along the direction of curvature of the convex face of the unit 15. A similar slight rotation, and for a similar purpose, will be imparted to the unit 16, but in a direction opposite to that indicated by the arrow 46, during swing of said unit from its 16ª position to its 16ᵇ position.

Figures 8, 9:
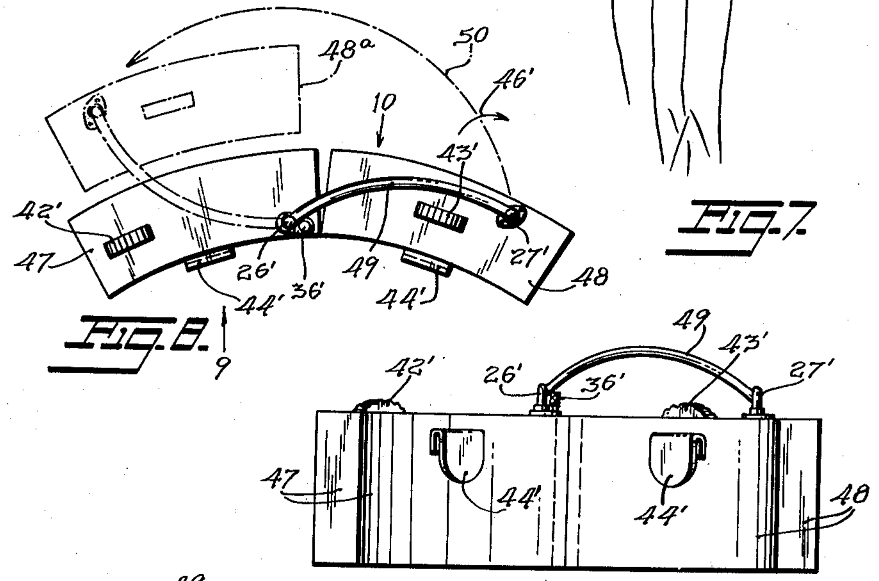
Fig. 8 is a view similar to Fig. 1, but showing a now favored two-unit-cabinet embodiment of the invention.
Fig. 9 is a side elevation, looking in the direction of the arrow 9 of Fig. 8.
Figure 10:
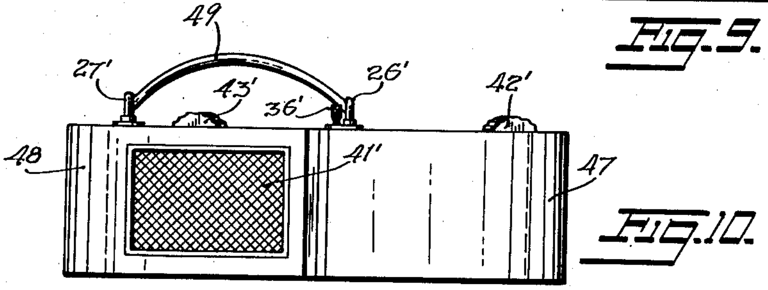
Fig. 10 is also a side elevation, but looking in the direction of the arrow 10 of Fig. 8.

Referring to Figs. 8–10, the two units 47 and 48 of the two-unit-cabinet here shown are of like lengths along their directions of curvilinear extension. The parts to which are applied reference numerals with primes added correspond, respectively, to the parts to which are applied reference numerals without primes. The standards 26′ and 27′ are on, respectively, the units 47 and 48, and mounted thereon by means exactly as already described in connection with the mountings of the standards 26 and 27 on the units 16 and 15; and the means provided in connection with the thumb-screw 36′ is exactly as already described in connection with the thumb-screw 36.

The standards 26′ and 27′, together with a connecting hollow bridge-piece 49, provide a unitary link-coupling between the units 47 and 48. The bridge-piece 49, although it is shown as of greater length, and with a longitudinal curvature of greater radius, than the hollow bridge-piece 28, is in all other respects exactly like the coupling 18. The uninterrupted tunnel or passageway provided through the link-coupling of Figs. 8–10 allows wires corresponding to, in substitution for, the wires 40 to be extended therethrough and for being always maintained in circuit by way of the interior of this coupling regardless of its angular position relative to either of the units 47 and 48.

As perhaps constituting a more convenient arrangement in a two-unit cabinet as in Figs. 8–10, the knobs 42' and 43' are here shown as one carried at the top of the unit 47 and the other carried at the top of the unit 48.

For redisposing the radio receiver as shown in dot and dash lines in Fig. 8, and assuming the thumb-screw 36' is not so tightened as to prevent swing of the link-coupling including the bridge 49, it is merely necessary to swing the cabinet unit 48 in the direction indicated by the arrow 50 until said unit is arranged as at 48ª. In thus swinging the unit 48, said unit, when it has partially cleared the adjacent end of the unit 47, is also given sufficient rotation in the direction of the arrow 46' to allow advance of said unit endwisely to be effected along the direction of curvature of the convex face of the unit 47, and so bring the unit 47 to its 47ª position.

Figure 11:
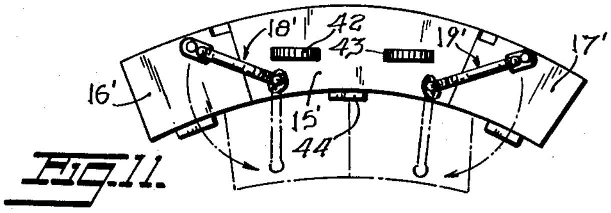
Fig. 11 is a similar view to Fig. 1 but illustrating a modification of the invention.

In Fig. 11 the three cabinet units 15', 16' and 17' are shown to be swingably connected by link-type couplings 18' and 19' similar to those shown in Fig. 1 but couplings 18' and 19' will permit the two shorter end units 16' and 17' to be swung toward the inner side of the longer unit 15'.

In other respects this form of the invention is similar to the previous form and the various parts may be recognized by corresponding reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a portable receiver having adjacent cabinet units, an inverted U-shaped bridge extended over the adjacent contacting edges of the cabinet units, said bridge having the free end of one of its side arms turnably attached to one of the cabinet units, a fitment rotatively mounted on the other side arm of said bridge, a plate secured to the top face of the other of the cabinet units, an outwardly directed flange formed on the free end of the other of said side arms and partially recessed into the bottom face of said fitment and having its bottom face resting on the top face of said plate, said fitment having a laterally extending flange formed with an aperture, a screw having a head portion engaging the top of said flange of said fitment and a reduced intermediate portion rotatively extended into said aperture, and a threaded shank portion depending from said reduced intermediate portion of said screw and threadedly engaging said plate, whereby said screw can be turned to clamp the flange on said bridge between said fitment and the top of said plate holding the said other cabinet unit against rotation relative to said bridge.

2. In a portable receiver having adjacent cabinet units, and inverted U-shaped bridge extended over the adjacent contacting edges of the cabinet units, said bridge having the free end of one of its side arms turnably attached to one of the cabinet units, a fitment rotatively mounted on the other side arm of said bridge, a plate secured to the top face of the other of the cabinet units, an outwardly directed flange formed on the free end of the other of said arms and partially recessed into the bottom face of said fitment and having its bottom face resting on the top face of said plate, said fitment having a laterally extending flange formed with an aperture, a screw having a head portion engaging the top of said flange of said fitment and a reduced intermediate portion rotatively extended into said aperture, and a threaded shank portion depending from said reduced intermediate portion of said screw and threadedly engaging said plate, whereby said screw can be turned to clamp the flange of said bridge between said fitment and the top of said plate holding the said other cabinet unit against rotation relative to said bridge, said flange of said fitment having an undercut cavitation in its bottom face, and a spring washer engaged concentrically upon said shank portion within said cavitation and operating between the adjacent faces of said intermediate portion and said plate.

MILTON LICHAW.

REFERENCES CITED

The following references are of record in the file of this patent:

UNITED STATES PATENTS

| Number | Name | Date |
|---|---|---|
| 1,935,790 | Dame | Nov. 21, 1933 |
| 2,071,883 | Hodny | Feb. 23, 1937 |
| 2,098,636 | Smith | Nov. 9, 1937 |
| 2,285,159 | Hanson | June 2, 1942 |

FOREIGN PATENTS

| Number | Country | Date |
|---|---|---|
| 99,372 | Sweden | July 9, 1940 |